United States Patent
Lewis et al.

(10) Patent No.: US 9,875,286 B1
(45) Date of Patent: Jan. 23, 2018

(54) SCORING MESSAGES BASED ON SENDER ATTRIBUTES

(71) Applicant: Google Inc., Mountain View, CA (US)

(72) Inventors: Justin Lewis, Marina del Rey, CA (US); Jeffrey Lee-Chan, Venice, CA (US)

(73) Assignee: Google Inc., Mountain View, CA (US)

( * ) Notice: Subject to any disclaimer, the term of this patent is extended or adjusted under 35 U.S.C. 154(b) by 129 days.

(21) Appl. No.: 14/174,128

(22) Filed: Feb. 6, 2014

(51) Int. Cl.
*G06F 17/30* (2006.01)

(52) U.S. Cl.
CPC ................ *G06F 17/3053* (2013.01)

(58) Field of Classification Search
USPC ........ 707/607, 609, 687, 705, 790, 813, 821
See application file for complete search history.

(56) References Cited

U.S. PATENT DOCUMENTS

| 8,312,056 | B1 | 11/2012 | Peng et al. |
| 8,510,380 | B2 | 8/2013 | Faller et al. |
| 8,572,094 | B2 | 10/2013 | Luo et al. |
| 2012/0150631 | A1 | 6/2012 | Root et al. |
| 2012/0290446 | A1* | 11/2012 | England ............. G06Q 30/0282 705/27.1 |
| 2013/0297543 | A1 | 11/2013 | Treiser |
| 2013/0297619 | A1 | 11/2013 | Chandrasekaran et al. |
| 2013/0311572 | A1 | 11/2013 | Faller et al. |
| 2014/0237057 | A1* | 8/2014 | Khodorenko ........... H04L 51/32 709/206 |

* cited by examiner

*Primary Examiner* — Sana Al Hashemi
(74) *Attorney, Agent, or Firm* — Byrne Poh LLP

(57) ABSTRACT

A message sent by a message sender to a message receiver can be, e.g., upon arrival at a message system server, ranked or scored based on attributes of the message sender such as influence and engagement. Influence can relate to a determination of how influential the message sender is. Engagement can relate to a determination of how interested the message sender is in content published or syndicated by the message receiver. The message score can reflect a combination of an influence score and an engagement score. Scored messages can be sorted or filtered according to a desired element and a presentation of messages stored by the message system can be updated (e.g., ordered and scored) according to the desired element.

16 Claims, 11 Drawing Sheets

SCORING MESSAGES BASED ON SENDER ATTRIBUTES

TECHNICAL FIELD

This disclosure generally relates to scoring or ranking messages such as email messages or online posts based on attributes (e.g., influence, engagement, etc.) associated with the message sender.

BACKGROUND

Communication mechanisms exist on many online platforms. For example, standardized mechanisms allow users to receive email messages from any message sender who inputs an email address associated with the message receiver. Apart from email, social network services and many content hosting services allow users to communicate with one another, either by private message (e.g., delivered to an internal inbox associated with an account of the message receiver) or posted to a feed or comments section associated with content (e.g., text, images, video, etc.) published by the message receiver.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to scoring or ranking messages based on attributes of the message sender. A message component can identify message data that represents a message sent by a message sender to a message receiver. An influence component can determine influence data that represents a level of influence associated with the message sender. An engagement component can determine engagement data that represents a level of engagement associated with the message sender. A scoring component can determine a score for the message as a function of the influence data and the engagement data.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
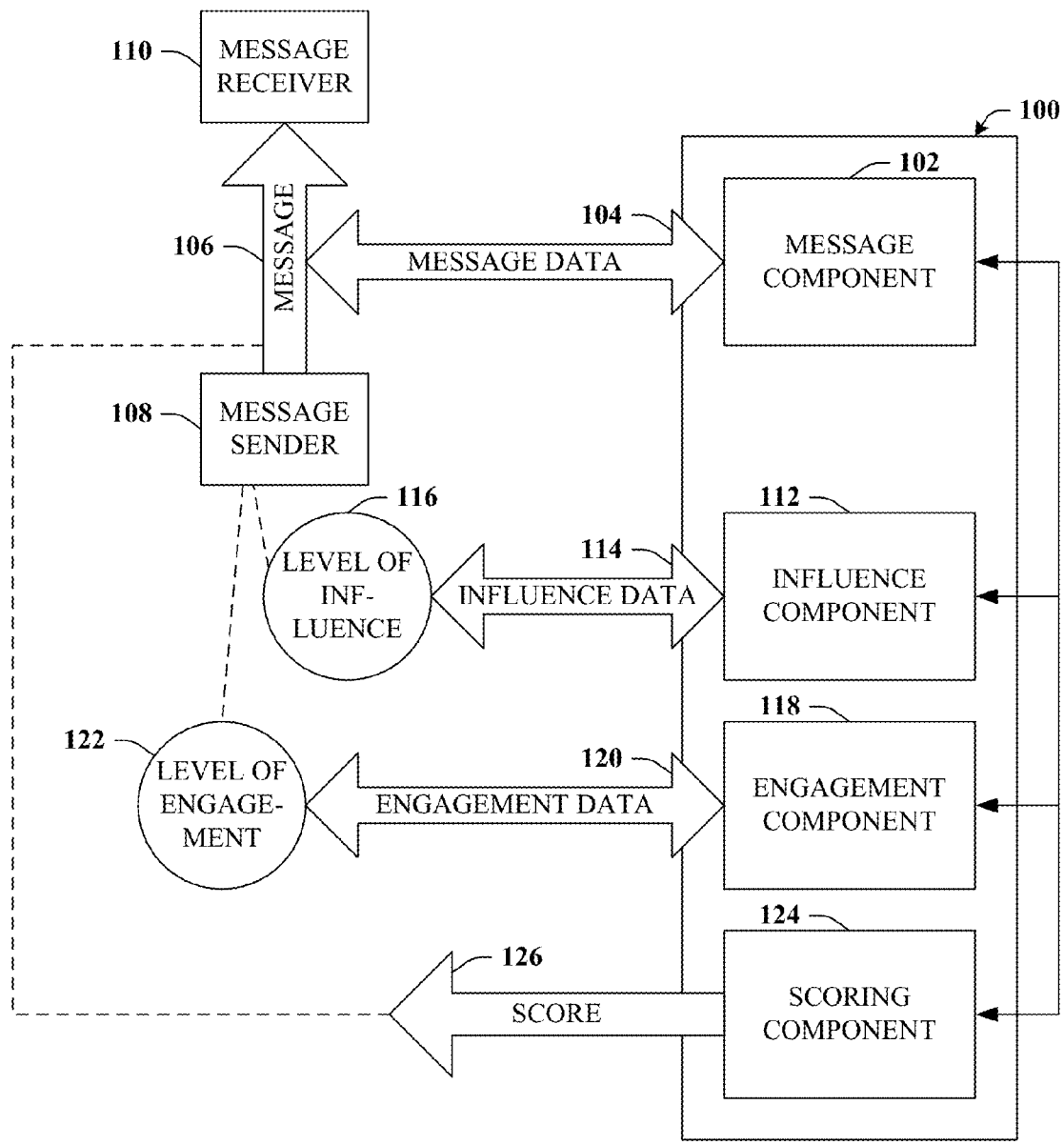
FIG. 1 illustrates a block diagram of an example system that can provide for scoring or ranking messages based on influence and engagement associated with a message sender in accordance with certain embodiments of this disclosure.

As used herein, the terms "message receiver," "message sender," and "user" are intended to refer to respective devices associated with one or more user accounts or identities. While these terms generally refer to individuals, as used herein, such can be devices, accounts, identities or other data associated with those individuals invoked or referred to by proxy. For example, a "message sender" can refer to a device that transmits a message on behalf of an individual associated with a particular user account.

Users of online platforms (e.g., email systems, content hosting systems, social networking systems, etc.), whether associated with individuals, businesses, or other entities, can receive a very large number of incoming communications (e.g., messages) in response to published content or other behavior or activities. In some cases, such users lack the resources to respond to or otherwise process every message that is received. Adequately responding, either by reply or by engaging in behavior suggested by the incoming message can improve goodwill, nurture relationships, encourage interest, and even act as a form of marketing via, for instance, the network effect or viral marketing.

In that regard, responding to incoming messages can be beneficial to users of the online platform, particularly when the message sender is very influential or very engaged with content (or other goods or services) associated with the message receiver. If the message sender is engaged, then it is more likely that activity of the message sender will be directed to promotion of the content (or other goods or services) of the message receiver or otherwise behave in a manner that is beneficial to the interests of the message receiver. If the message sender is influential, then activities of the message sender can reach a large audience. In both cases, it can be beneficial to the message receiver to respond to message senders (e.g., that are influential and/or engaged) in an appropriate manner, even if the message receiver lacks the resources to respond to all message senders.

Embodiments of the subject disclosure relate to scoring an incoming message (e.g., from a message sender) based on criteria associated with the message sender. For example, scoring can reflect a level of engagement the message sender has with content or other aspect associated with the message receiver. Scoring can also reflect a level of influence the message sender has. The level of influence and the level of engagement can be combined to reflect a total score. By scoring incoming messages, in some embodiments, an inbox or other messaging mechanism can be sorted or filtered based on the score or based on a component of the score. Advantageously, arranging an output associated with the messaging mechanism by score can enable parties associated with the message receiver to identify key influencers and to prioritize responses or identify messages that merit closer inspection or special attention.

In some embodiments, the disclosed subject matter can include, leverage, or interface to an identification mechanism that can be employed to identify users. For example, a user might be identified based on a social networking profile or account, a content hosting service channel or account, or the like. The user identity can include a unique identifier, a name, profile picture, alternative contact methods (e.g., email, phone number) and so forth.

In some embodiments, the disclosed subject matter can include, leverage, or interface to a messaging system, such as an email mechanism, a content hosting service account inbox, a social networking post, a short message service (SMS) mechanism, etc. The messaging system typically includes a client for rendering the received messages and a centralized distributed server(s) for storing the list of messages and serving them to the clients. Messages might have multiple states such as unread, read, starred, etc.

In some embodiments, the disclosed subject matter can include, leverage, or interface to a tracking mechanism that can identify a creator or brand and track other users' engagement with the creator or brand across multiple platforms or websites. Such can apply to actions or data points received from a particular site or source or many sites across the web or other sources. For example, a popular content creator that uses a content hosting service to provide access to content might also have a significant following on an independent social networking system or other platforms. It is understood that user identification and tracking are not limited by the platform of the messaging system or any one platform, but can be independent. For instance, attribution links or another logging mechanism can be employed to track users and scanners can be utilized to periodically or continuously inspect associated logs. Attribution links represent a mechanism for associating clicks to the content on one platform to a user account associated with one who "originated" the click rather than or in addition to the user account associated with a login to view the content. For example, suppose a user of a social networking service is logged into that service as user account 1. The user clicks a link to a video hosted by a content hosting service to watch the video. The user might already be logged into the content hosting service as user account 2, or might be automatically logged in based on cookies or other well-known mechanisms. Attribution links/tags can be employed to identify both user account 1 and user account 2. In addition, mechanisms can exist to associate the two accounts in some manner.

In some embodiments, the disclosed subject matter can include, leverage, or interface to a scoring mechanism that can determine relevant attributes associated with the message sender such as, e.g., the influence, reach, or audience of social transactions as well as engagement with various published content. The scoring mechanism can collect data based on or in connection with crawling uniform resource locators (URLs) or application programming interfaces (APIs) to determine a number of followers and/or a size of a potential audience for the message sender. In addition to a size of the message sender's audience, a knowledge graph mechanism can be leveraged to measure or weight an associated influence with the audience. The scoring mechanism can weight data based on temporal attributes. For example, a more recent data point (e.g., a post to an online service) might be weighted more heavily than a less recent data point both in terms of engagement and influence.

In some embodiments, the disclosed subject matter can include, leverage, or interface to a logic layer that can utilize the scoring mechanism and other elements or components to generate a sorted list for a client. For example, the scoring mechanism can examine attributes of an incoming message to identify whether the message is read, unread, designated as spam, etc., which can be utilized in the scoring process. It is appreciated that the logic layer can exist on a server associated with the messaging system. In other implementations, the logic layer can exist on a client.

In some embodiments, the disclosed subject matter can include, leverage, or interface to a client, which can receive the messages. These messages can be sorted by the client prior to rendering, or sorted at an associated server and received as a combined representation of the above components.

Example Systems that Score Messages

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can consent to providing data in connection with data gathering aspects. In instances where a user consents to the use of such data, the data may be used in an authorized manner. Moreover, one or more implementations described herein can provide for anonymization of identifiers (e.g., for devices or for data collected, received, or transmitted) as well as transparency and user controls that can include functionality to enable users to modify or delete data relating to the user's use of a product or service.

Referring now to FIG. 1, a system 100 is depicted. System 100 can, inter alia, provide for scoring or ranking messages based on influence and engagement associated with a message sender. Embodiments disclosed herein can, for example, facilitate sorting, filtering, or otherwise organizing or prioritizing messages based on attributes of the message sender. System 100 can include a memory that stores computer executable components and a processor that executes computer executable components stored in the memory, examples of which can be found with reference to FIG. 10. It is to be appreciated that the computer 1002 can be used in connection with implementing one or more of the systems or components shown and described in connection with FIG. 1 and other figures disclosed herein. As depicted, system 100 can include a message component 102, an influence component 112, an engagement component 118, and a scoring component 124.

Message component 102 can be configured to identify message data 104 representing a message 106 sent by message sender 108 and received by message receiver 110. Message sender 108 and message receiver 110 can be client devices associated with individuals or entities that are employed to transmit/receive message 106 on the associated individual's behalf. Message sender 108 and message receiver 110 can be respectively associated with one or more user accounts, which can include a user account associated with the underlying messaging system(s) (not shown in FIG. 1, but further detailed in connection with FIG. 3). Message 106 can be any type of suitable message, various examples of which are provided with reference to FIG. 2.

Figure 2:
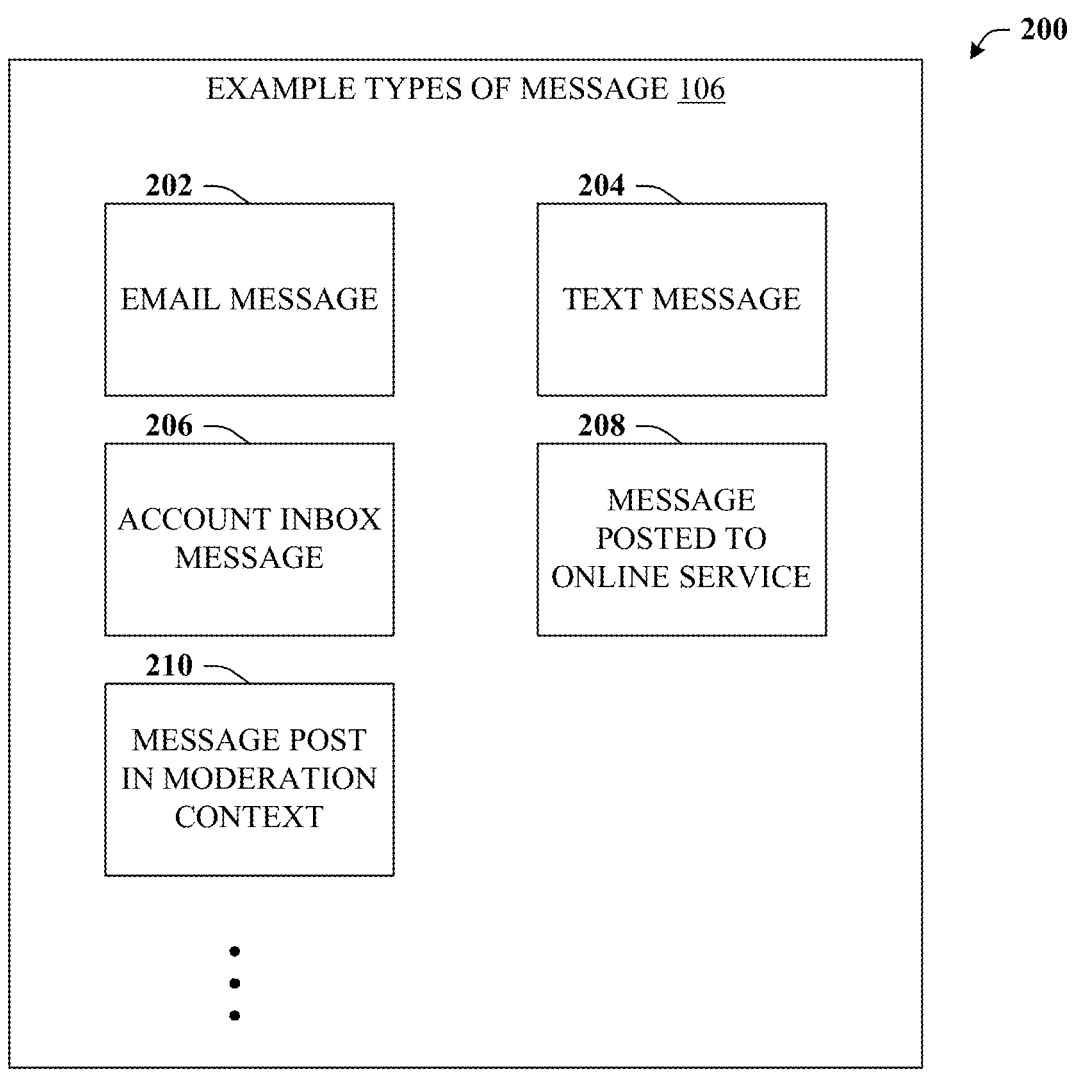
FIG. 2 provides a block diagram illustration that depicts numerous example types for the message in accordance with certain embodiments of this disclosure.

While still referring to FIG. 1, but referring also to FIG. 2, illustration 200 is provided. Illustration 200 depicts numerous example types for the message 106. For instance, message 106 can be an email message 202 that, e.g., conforms to standards such as simple mail transfer protocol (SMTP) or the like. As another example, message 106 can be a text message 204 that is, e.g., provided via short message service (SMS) or another service and typically associated with mobile devices.

In some embodiments, message 106 can be an account inbox message 206 or a message posted to an online service. For example, consider a first user of a content hosting service to post videos or other content. Other users of the content hosting service might access that content and decide to provide some form of feedback. In some cases, such might be a private message delivered to the first user. That private message can be accessed by the first user by logging into the content hosting service and navigating to an account inbox maintained by the content hosting service, which represents an example of account inbox message 206.

Additionally or alternatively, the other users might post a public message in a comments section for the content provided by the content hosting service. In this case, the posted message can represent message posted to an online service 208. In some embodiments, message 106 can be a message post in a moderation content 210. For example, consider the case in which posts to an online service are moderated. Such moderation might not be performed by the content owner or curator, but rather by a third-party entity. Further detail in connection with message 106 and/or message component 102 can be found at FIG. 3.

Continuing the discussion of FIG. 1, influence component 112 can be configured to determine influence data 114. Influence data 114 can represent a level of influence 116 associated with message sender 108. Additional detail relevant to these elements is provided in connection with FIG. 4. However, briefly, level of influence 116 can relate to a size of an audience for message sender 108 as well as an efficacy of such influence on that audience.

Engagement component 118 can be configured to determine engagement data 120. Engagement data 120 can represent a level of engagement 122 associated with message sender 108. These and other related elements are further described in connection with FIG. 5, but it is briefly noted that level of engagement 122 be determined based on interactions between message sender 108 and both message receiver 110 or entities or identities that constitute a audience or potential audience for message receiver 110.

Upon determination of influence data 114 and/or engagement data 120, scoring component 124 can examine those data. In particular, scoring component 124 can be configured to determine score 126 for message 106. Score 126 can be determined by scoring component 124 as a function of influence data 114 and engagement data 120. Accordingly, score 126 can represent an aggregate or total score associated with message 106. It is understood that component scores can also be provided, for instance a score that strictly reflects level of influence 116 or level of engagement 122. An example of such is provided in connection with FIG. 6.

Figure 3:
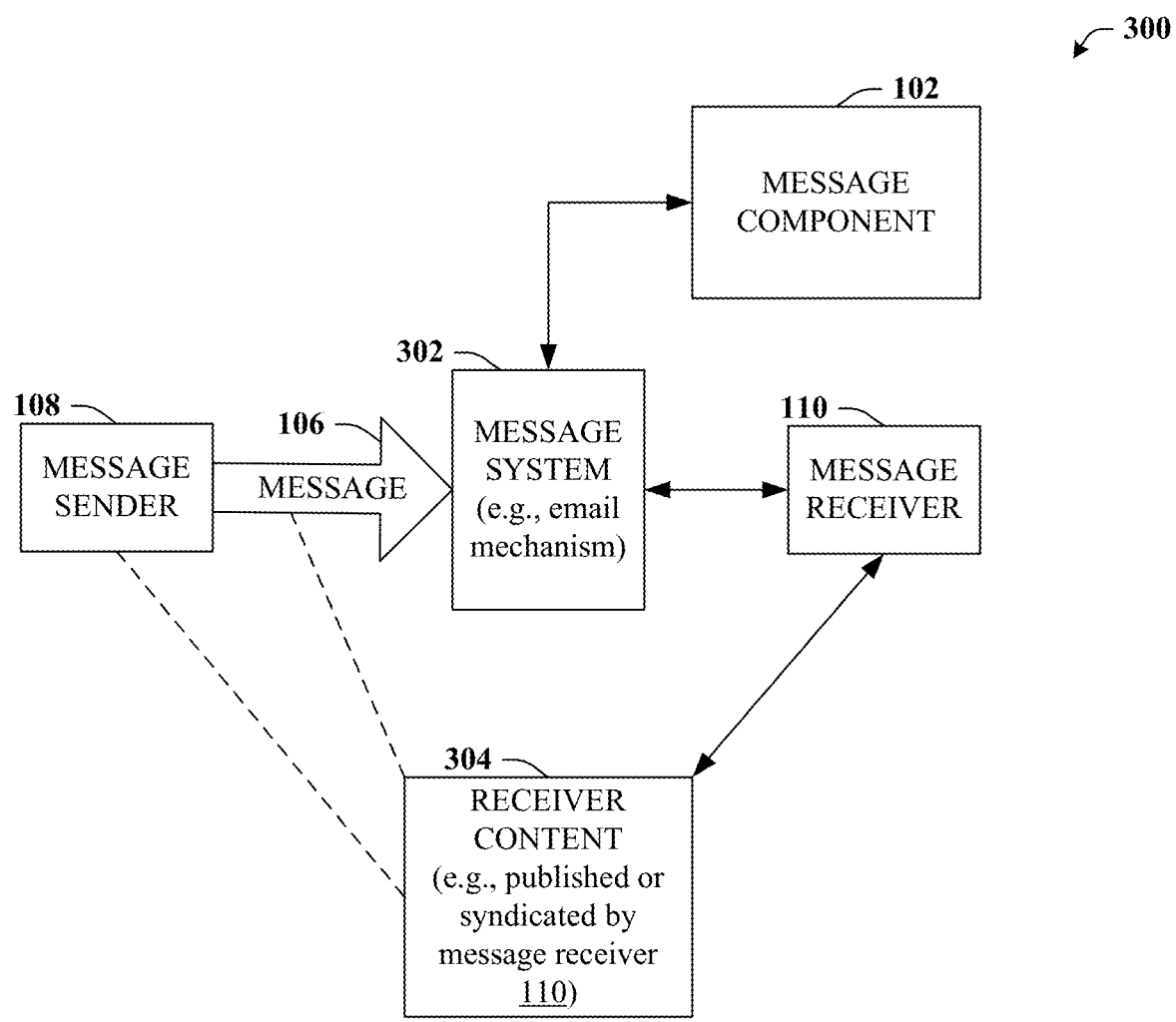
FIG. 3 illustrates a block diagram of a system that can provide for additional features or aspects in connection with message component in accordance with certain embodiments of this disclosure.

Turning now to FIG. 3, system 300 is provided. System 300 can provide for additional features or aspects in connection with message component 102. As previously noted, message component 102 can be configured to identify message data 104 that represents message 106 sent by message sender 108 and received by message receiver 110. In some embodiments, message component 102 can access this message data 104 (and/or message 106) by interfacing to a message system 302 associated with message 106.

Message system 302 can take a variety of forms based on the type of message 106. For example, if message 106 is an email message 202, then message system 302 can be an associated email system, whether server-based or client based, that can be accessed by message receiver 110. Thus, message system 302 is intended to represent an appropriate system for providing message receiver 110 access to message 106 regardless of the form of message 106, examples of which were illustrated in connection with FIG. 2.

In some embodiments, message 106 can relate to content published by message receiver 110, which is denoted herein as receiver content 304. Returning to the previous example, in which a user (in this case message receiver 110) posts a video (e.g., published content) for other users to access. When those other users (in this case message sender(s) 108) post replies or send private messages in response to the published content, such can constitute message 106 in this alternative embodiment. In some embodiments, receiver content 304 can relate to content that is syndicated to the message receiver 110.

Figure 4:
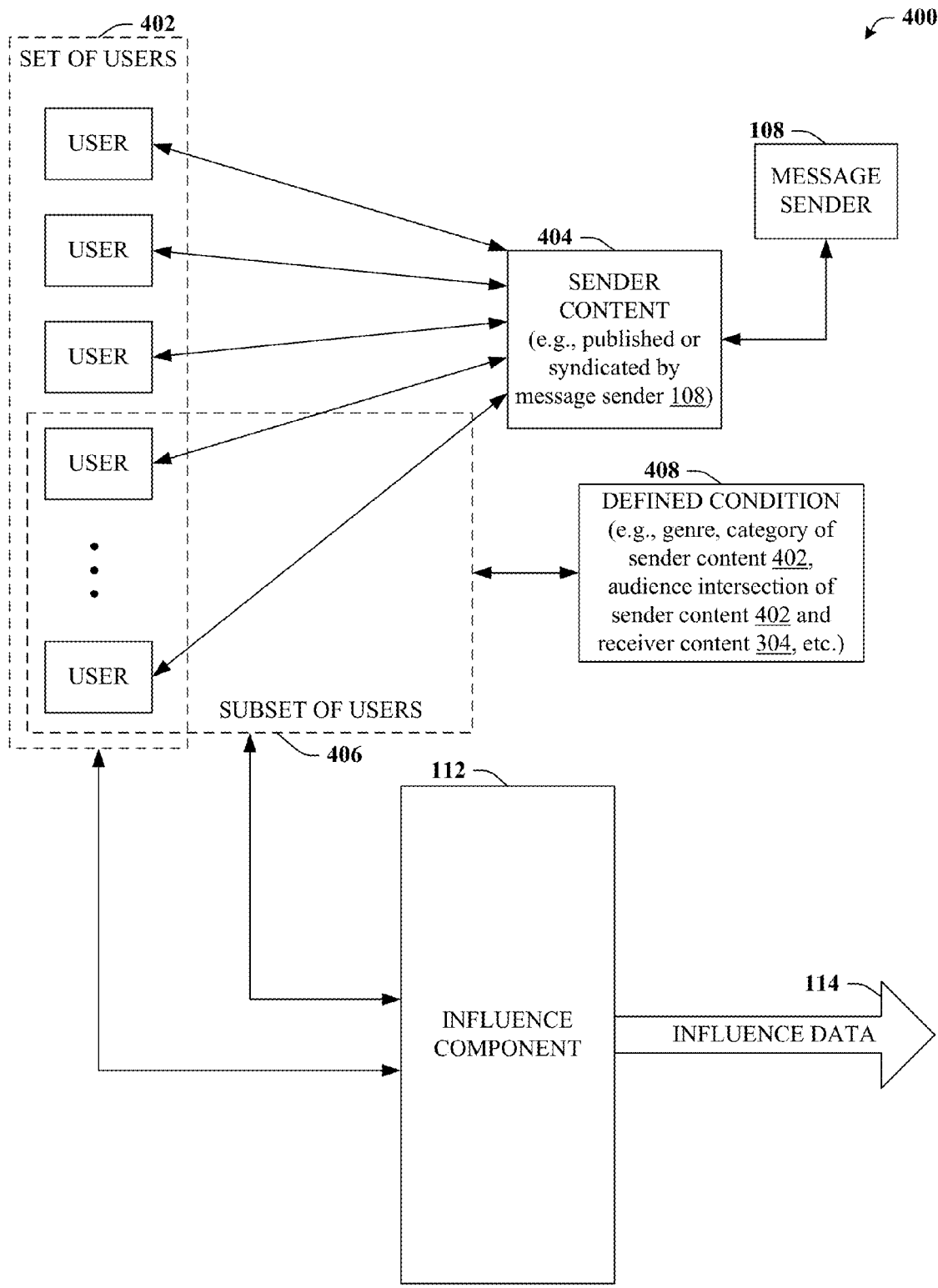
FIG. 4 illustrates a block diagram of a system that provides for additional features or aspects in connection with the influence component in accordance with certain embodiments of this disclosure.

With reference now to FIG. 4, system 400 is illustrated. System 400 provides for additional features or aspects in connection with the influence component 112. As previously detailed, influence component 112 can determine influence data 114 that represents a level of influence 116 associated with message sender 108. In some embodiments, influence component 112 can determine influence data 114 based on a set of users 402 that interact with published content associated with message sender 108. Such content is denoted herein as sender content 404. It is noted that sender content 404 is distinct from receiver content 302. In both cases such can represent content published or syndicated by a given entity (e.g., by message sender 108, message receiver 110, or an agent thereof) or, in some embodiments, goods or services associated with that entity, in which case the content 302, 404 might be embodied as an advertisement or reference to the good or service. Put another way, if message sender 108 was a large audience, which can be evident when set of users that interact with sender content 404 is large, then a determined level of influence 116 (and by proxy influence data 114) can be large as well.

In some embodiments, influence component 112 can determine influence data 114 based on a subset 406 of the set of users 402. For example, subset 406 can represent a filtering applied to set of users 402 such that only certain users or certain interactions with sender content 404 is employed to determine influence data 114 or might carry greater weight in the determination of influence data 114. For instance, subset 406 can reflect only those users that satisfy a defined condition 408.

In some embodiments, defined condition 408 can represent a genre, category or other type associated with sender content 404. For instance, if message sender 108 publishes or syndicates content across many domains only certain domains might be relevant to the area of interest of message receiver 110. Thus, influence component 112 can filter users 402 or associated interactions with sender content 404 based on a type associated with the sender content 404. By way of illustration, suppose message receiver 110 is related to an automotive manufacturing business, whereas message sender 108 is related to a consumer goods testing service. In that case, users 402 that interact with sender content 404 that relates to automobiles might be more relevant (at least to message receiver 110) than users 402 that interact with sender content 404 that relates to beverages.

In some embodiments, defined condition 408 can relate to an intersection in the audience for sender content 404, such as set of users 402, and an audience (not shown) for receiver content 302, of which message sender 108 is typically a member. In that case, subset 406 can be filtered to include (or weight more favorably) users 402 that consume both sender content 404 and receiver content 302 or tailored to measure or weight associated interactions differently.

Figure 5:
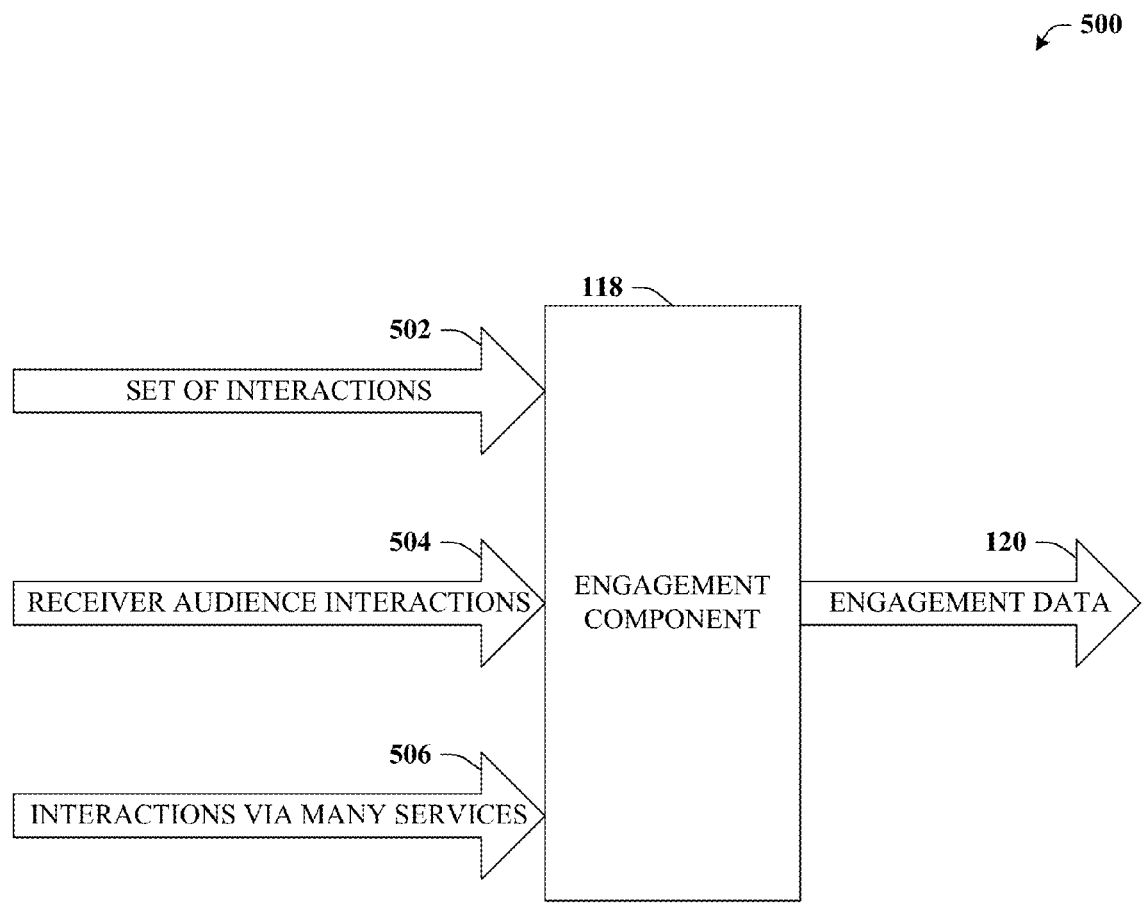
FIG. 5 illustrates a block diagram of a system that provides for additional features or aspects in connection with the engagement component in accordance with certain embodiments of this disclosure.

Turning now to FIG. 5, system 500 is depicted. System 500 provides for additional features or aspects in connection with the engagement component 118. As previously detailed, engagement component 118 can determine engagement data 120 that represents a level of engagement 122 associated with message sender 108. In some embodiments, engagement component 118 can determine engagement data 120 based on a set of interactions between the message sender 108 and the message receiver 110, which is denoted herein as set of interactions 502. For instance, if it is discovered that message sender 108 has many interactions associated with receiver content 302, then a determined level of engagement 118 can be high as well. It is appreciated that negative or adverse interactions as well as those flagged as spam can, in some embodiments, be filtered or treated differently, as such typically are not indicative of the type of engagement message receiver 110 will expect to be scored in a like manner.

In some embodiments, engagement component 118 can determine engagement data 120 based on a set of interactions (denoted herein by reference numeral 504) between message sender 108 and a member of an audience for published content (e.g., receiver content 302) of message receiver 110. Thus, if message sender 108 has significant interactions with and a member of the audience for receiver content 302, such can favorably affect engagement data 120.

In some embodiments, engagement component 118 can determine engagement data 120 based on interactions (denoted herein by reference numeral 506) that occur on forums hosted by multiple online services. Advantageously, determination of engagement data 120 is not limited to a single platform or a single service. Thus, the message receiver 110, who publishes content (e.g., receiver content 302) to a content hosting site might expect to have level of engagement 118 provided based on interactions that occur on that content hosting platform (e.g., account inbox, public posts, etc.). However, the message receiver 110, in that case, might not expect to have engagement data 120 for interactions that occur off-site, e.g., on an independent social networking platform or service. In such cases, engagement component 118 can leverage attribution tags that can be utilized to identify users across independent platforms via those independent platform user account identifiers.

Figure 6:
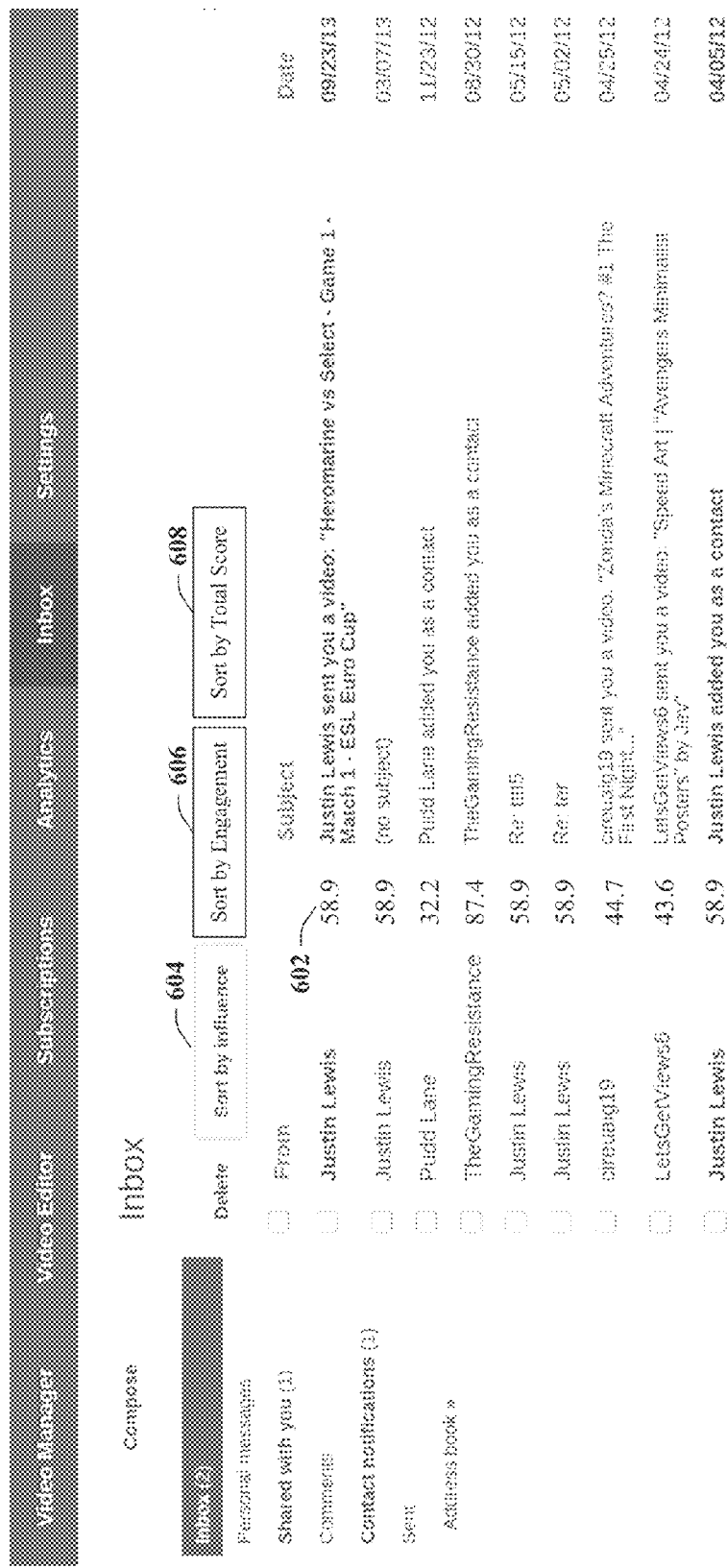
FIG. 6 illustrates an example graphical user interface that can provide for presenting the messages organized according to influence, engagement, or aggregate score in accordance with certain embodiments of this disclosure.

Referring to FIG. 6, example interface 600 is provided. Example interface 600 can provide for presenting messages 106 organized according to influence, engagement, or aggregate score. In this example, message 106 is an email message 202, and the associated interface is directed to an email system interface. However, it is understood that similar concepts can be applied to other types of message system interfaces with regard to messages 106 of different type, such as those detailed in connection with FIG. 2. In some embodiments, the disclosed concepts can be used in connection with interfaces that present public messages, particularly in a curation context. For example, consider an account holder of a content hosting service that is leveraged to provide a channel for the content uploaded by the channel owner. Typically, a comments section will exist for this content, which other users can employ to post public comments. The disclosed subject matter can be employed (either by the channel owner, or as a setting by users that access such content) to identify comments or posts from influential or highly engaged entities. Such can be used in variety of interesting ways, e.g., to sort or filter the public posts.

Referring specifically to example interface 600, an inbox is presented that is similar to well-known email inboxes, but with the addition of various objects that can be provided by leveraging the disclosed subject matter. For example, the list of messages (e.g., messages 106) in the inbox can be associated with a score 602. Score 602 can reflect aggregate score 126 determined by scoring component 124, but might additionally or alternatively reflect an influence score (e.g., based on influence data 114) or an engagement score (e.g., based on engagement data 120). All three scores might be presented, or only a selected score. Selecting a score to display as well as a sort order or other sorting or filtering features can be accomplished via objects 604-608. These objects or buttons can be selected and the presentation of the messages in the inbox can be updated appropriately.

Example Methods for Scoring Messages

Figure 7:
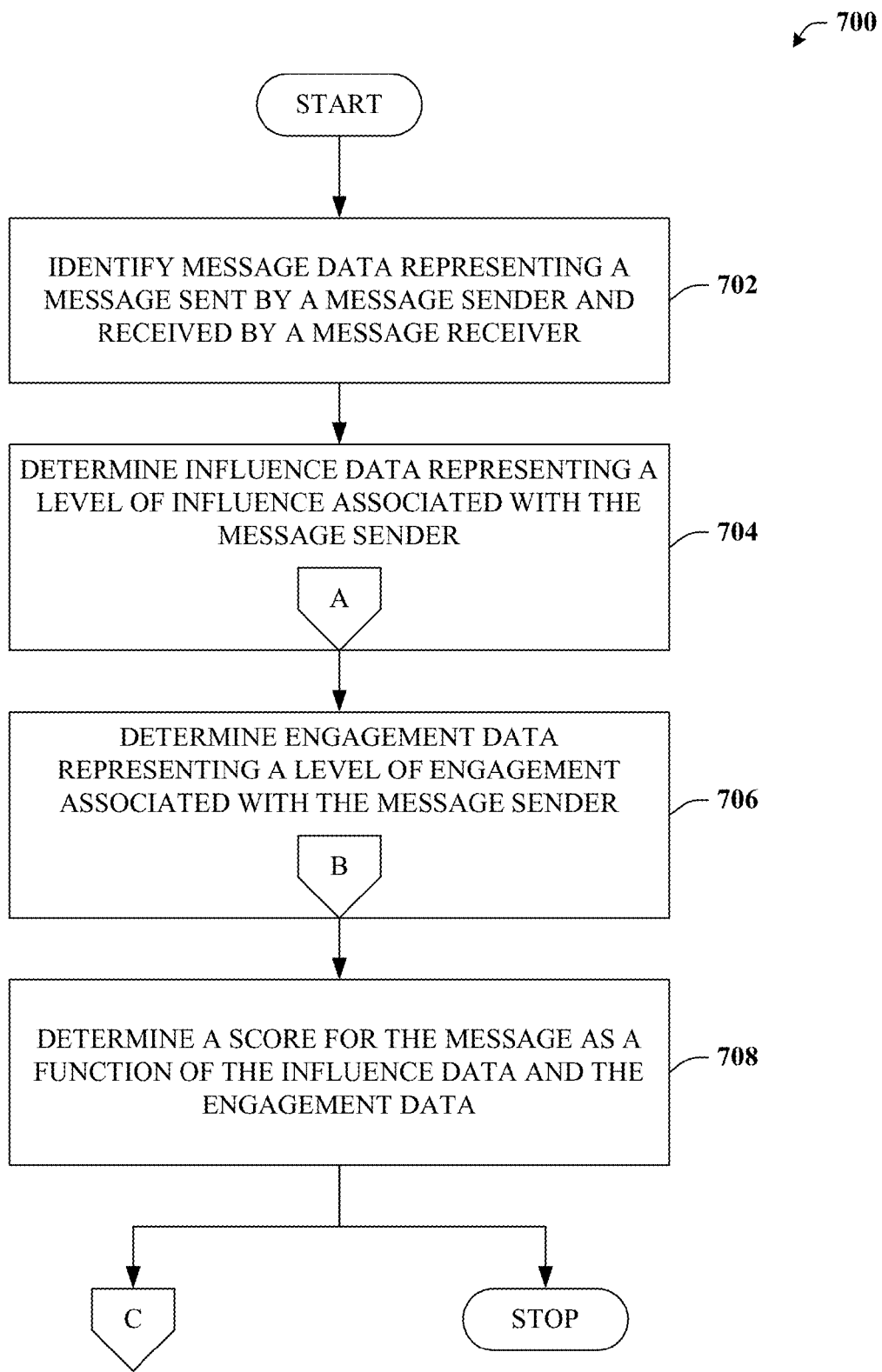
FIG. 7 illustrates an example methodology that can provide for scoring messages based on influence and/or engagement associated with the message sender in accordance with certain embodiments of this disclosure.
Figure 8:
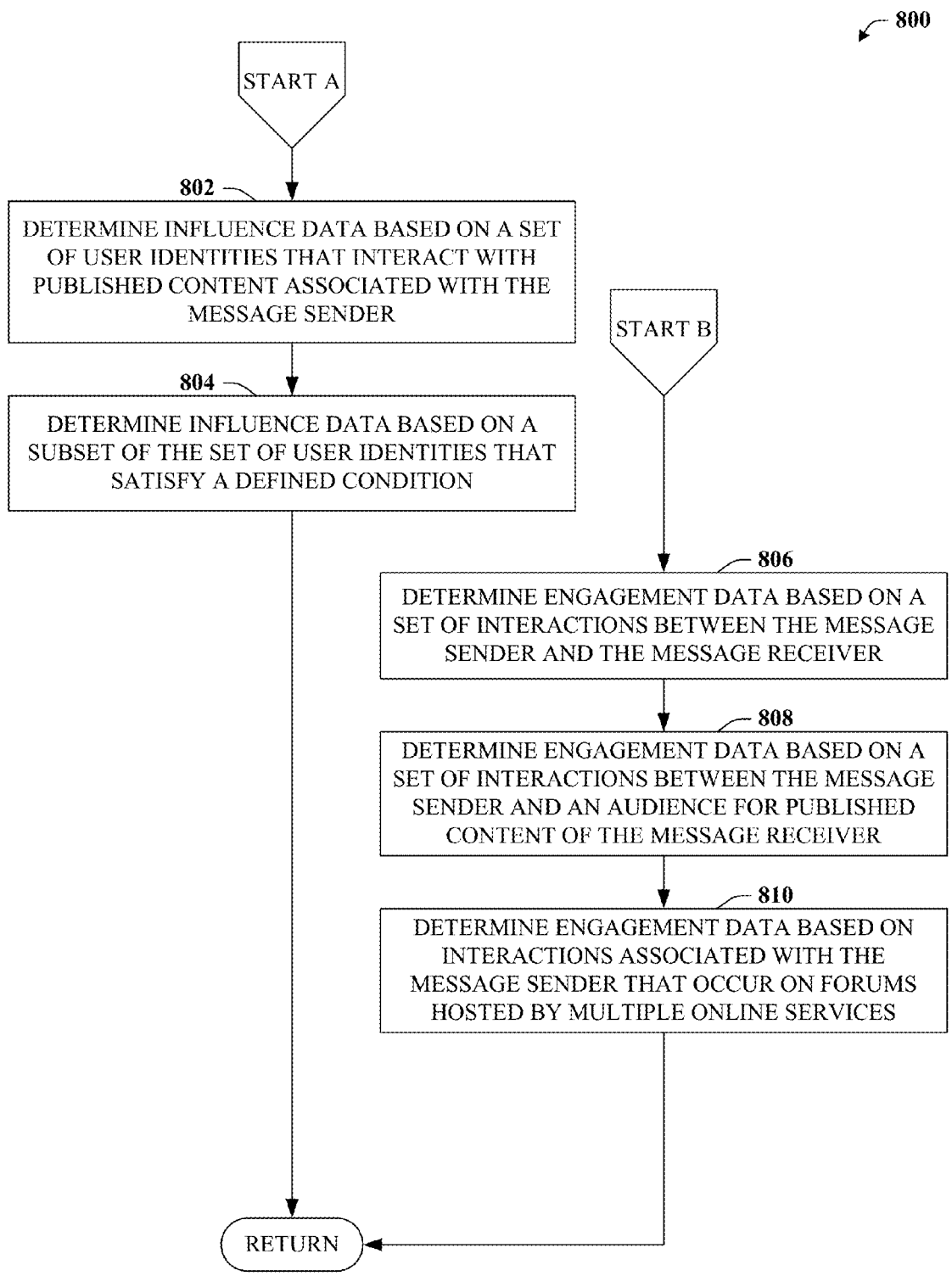
FIG. 8 illustrates an example methodology that can provide for additional features or aspects in connection with determining influence data and engagement data in accordance with certain embodiments of this disclosure.
Figure 9:
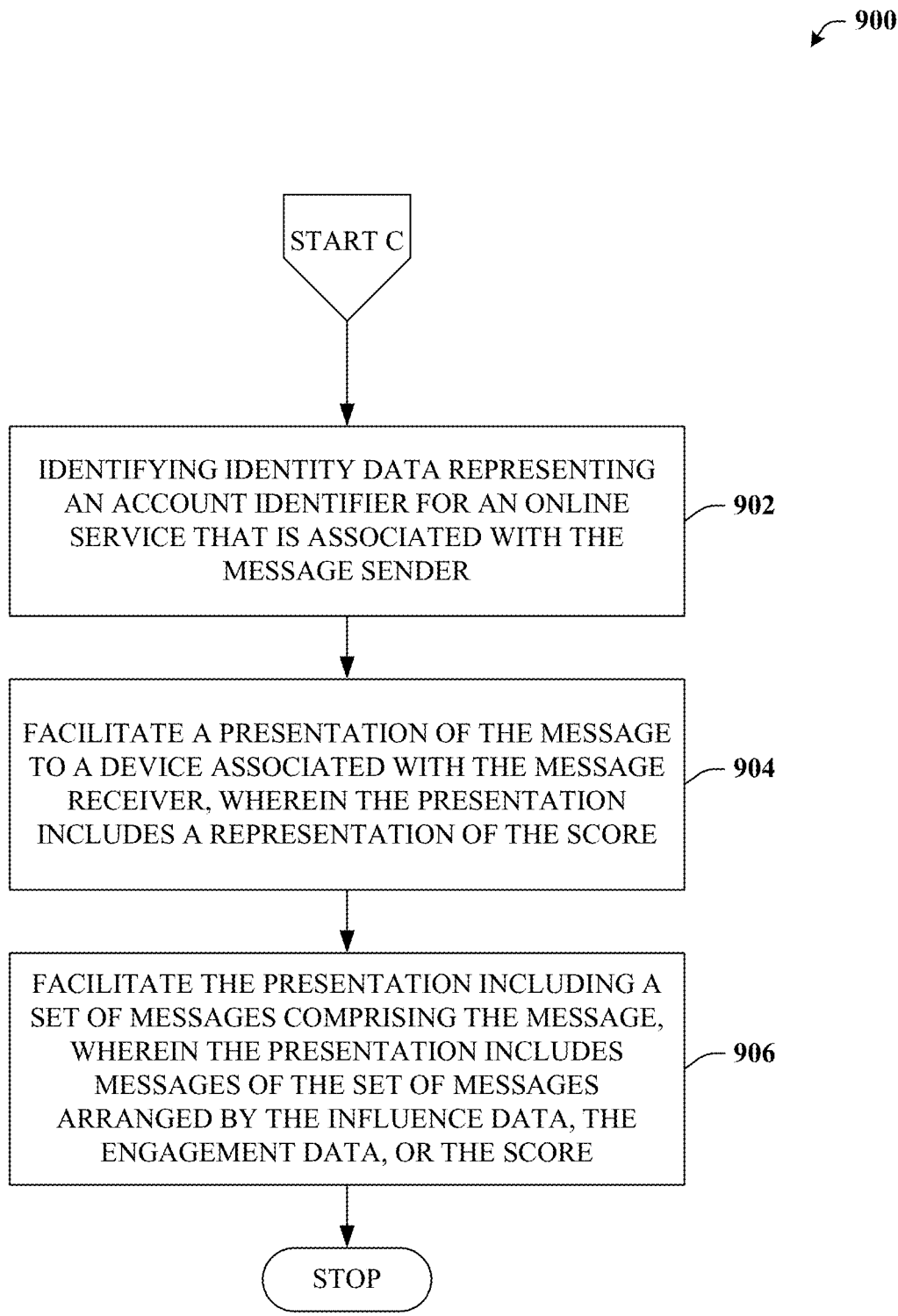
FIG. 9 illustrates an example methodology that can provide for additional features or aspects in connection with scoring messages based on influence and engagement of the message sender in accordance with certain embodiments of this disclosure.

FIGS. 7-9 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 7 illustrates exemplary method 700. Method 700 can provide for scoring messages based on influence and/or engagement associated with the message sender. For example, at reference numeral 702, message data representing a message sent by a message sender and received by a message receiver can be identified (e.g., by a message component). The message can be of any suitable type, including messages that are familiar such as an email message, a text message, a private message provided by an online service, a post submitted to the online service, and so forth. In this context, the message system (e.g., an email server or message server for the online service) that receives the message can serve as the message receiver receiving the message, even though such might represent different devices.

At reference numeral 704, influence data representing a level of influence associated with the message sender can be determined (e.g., by an influence component). The influence data can be determined in various ways, which can be referenced via insert A, which is further detailed in connection with FIG. 8.

At reference numeral 706, engagement data representing a level of engagement associated with the message sender can be determined (e.g., by an engagement component). The engagement data can be determined in a variety of independent or related ways, referenced via insert B, which is further described at FIG. 8.

At reference numeral 708, a score for the message can be determined (e.g., by a scoring component). This score can be determined as a function of the influence data determined at reference numeral 704 and the engagement data determined at reference numeral 706. Method 700 can proceed to insert C, which is detailed at FIG. 9, or can stop.

FIG. 8 illustrates exemplary method 800. Method 800 can provide for additional features or aspects in connection with determining influence data (as detailed at reference numeral 704 of FIG. 7) and engagement data (as detailed at reference numeral 706 of FIG. 7). For example, at reference numeral 802, influence data can be determined (e.g., by the influence component) based on a set of user identities that interact with published content associated with the message sender. At reference numeral 804, additionally or alternatively, influence data can be determined based on a subset of the set of user identities that satisfy a defined condition. In some embodiments, the defined condition can relate to a type, category, or genre of the published content. In some embodiments, the defined condition can relate to an intersection between the audience for the published content (e.g., associated with the message sender) and an audience for content published by the message receiver.

At reference numeral 806, engagement data can be determined (e.g., by the engagement component) based on a set of interactions between the message sender and the message receiver. Such interactions can relate to views of content published by the message receiver, message posted to a forum associated with the message receiver, message transmitted to the message receiver, and so forth. At reference numeral 808, engagement data can be determined based on a set of interactions between the message sender and a member of an audience for published content of the message receiver. At reference numeral 810, engagement data can be determined based on interactions associated with the message sender that occur on forums hosted by multiple online services, or forums hosted by a different online service than the online service by which the message receiver's content was published.

Turning now to FIG. 9, exemplary method 900 is depicted. Method 900 can provide for additional features or aspects in connection with scoring messages based on influence and engagement of the message sender. At reference numeral 902, identity data representing an account identifier for an online service that is associated with the message sender can be identified (e.g., by the influence component and/or the engagement component). Once identified, this identity can be employed to determine one or both the influence data and the engagement data.

At reference numeral 904, a presentation of the message can be facilitated (e.g., by a scoring component). The presentation can be provided to a device associated with the message receiver, wherein the presentation includes a representation of the score. In some embodiments, the presentation can include a representation of sub-scores or components of the score, such as, e.g., an influence score, an engagement score, or the like.

At reference numeral 906, the presentation can include a set of message comprising the message, wherein the presentation includes message of the set of messages arranged by the influence data, the engagement data, or the score.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
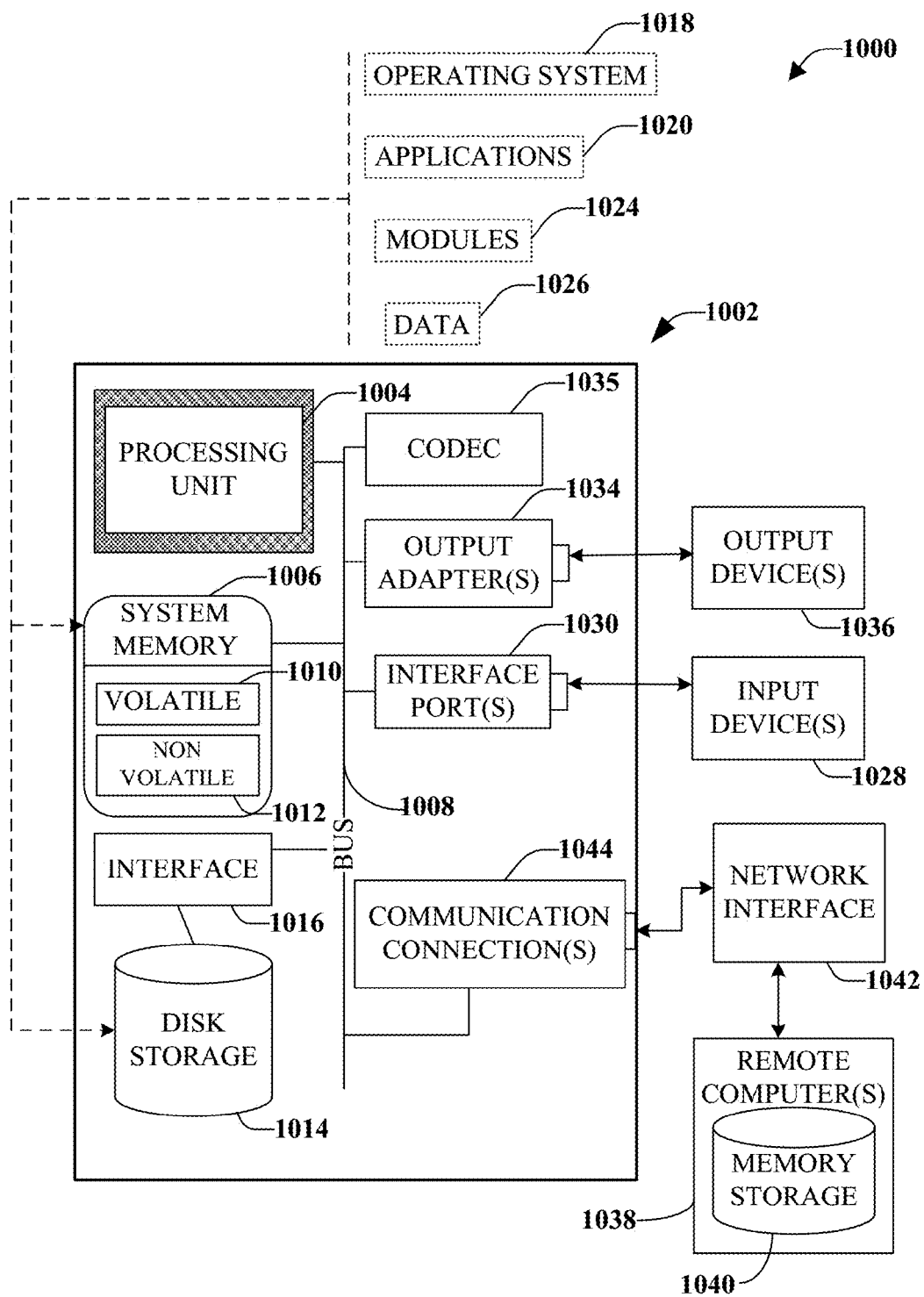
FIG. 10 illustrates an example schematic block diagram for a computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, software, or a combination of hardware and software. Although, codec 1035 is depicted as a separate component, codec 1035 may be contained within non-volatile memory 1012 or included in other components detailed herein. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 and/or transmitted to the server or application. The user can be provided the opportunity to authorize having such information collected and/or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
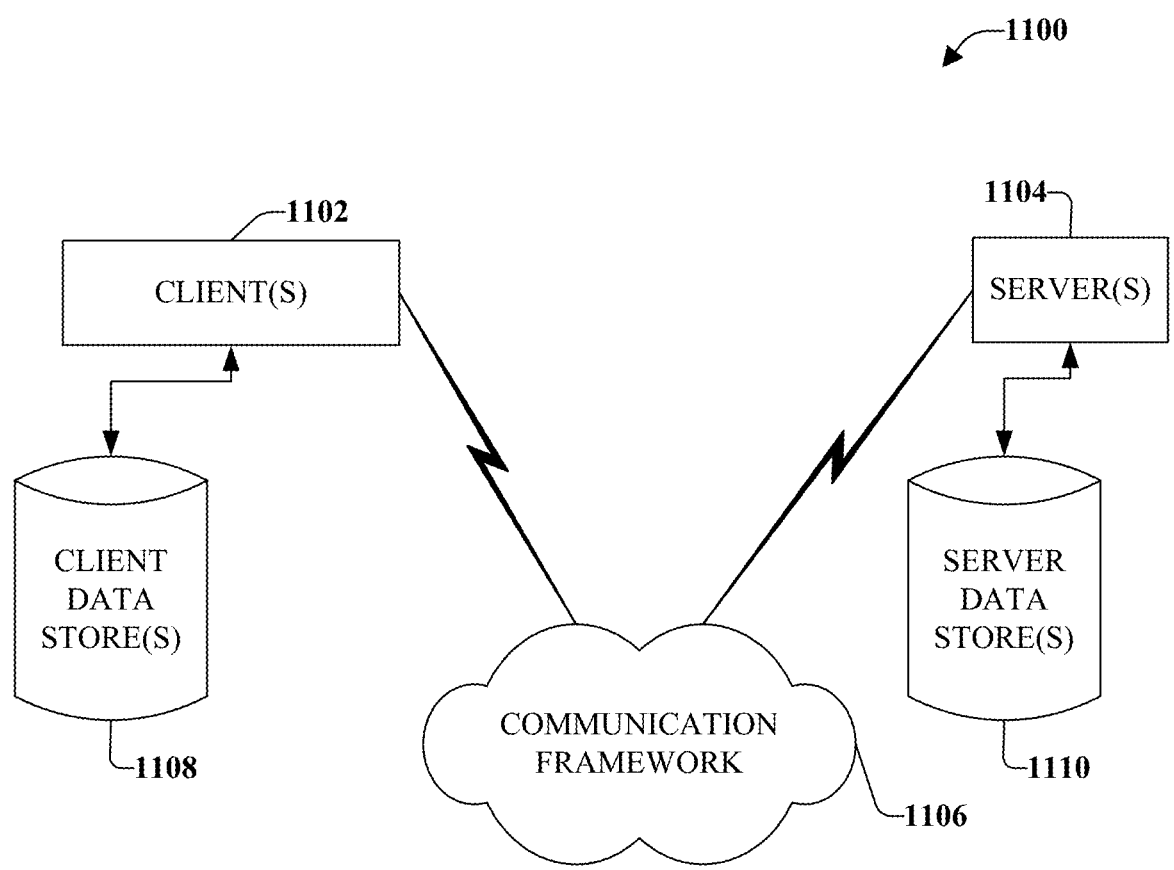
FIG. 11 illustrates an example block diagram of a computer operable to execute certain embodiments of this disclosure.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
  a memory that stores computer executable instructions; and
  a processor that, when executing the computer executable instructions stored in the memory, is programmed to:
    identify message data that represents a message sent by a message sender and received by a message receiver, wherein the message data relates to media content published by the message receiver;
    determine influence data that represents a level of influence associated with the message sender;
    determine engagement data that represents a level of engagement of the message sender with the media content published by the message receiver, wherein the level of engagement is based on a number of interactions between the message sender and at least one viewer of the media content published by the message receiver relating to the media content published by the message receiver;
    determine a score for the message as a function of the influence data and the engagement data;
    rank a plurality of messages to the message receiver that includes the message, wherein the rank is based on the determined score associated with each of the plurality of messages; and
    present at least a portion of the ranked plurality of messages in a user interface based on the score determined as a function of the influence data and the engagement data, wherein the user interface includes a first selectable input to sort and present the portion of the ranked plurality of messages based on the influence data and a second selectable input to sort and present the portion of the ranked plurality of messages based on the engagement data.

2. A method, comprising:
employing a computer-based processor to execute computer executable components stored in a memory to perform the following:
  identifying message data representing a message sent by a message sender and received by a message receiver, wherein the message data relates to media content published by the message receiver;
  determining influence data representing a level of influence associated with the message sender;
  determining engagement data representing a level of engagement of the message sender with the media content published by the message receiver, wherein the level of engagement is based on a number of interactions between the message sender and at least one viewer of the media content published by the message receiver relating to the media content published by the message receiver;
  determining a score for the message as a function of the influence data and the engagement data;
  ranking a plurality of messages to the message receiver that includes the message, wherein the rank is based on the determined score associated with each of the plurality of messages; and
  presenting at least a portion of the ranked plurality of messages in a user interface based on the score determined as a function of the influence data and the engagement data, wherein the user interface includes a first selectable input to sort and present the portion of the ranked plurality of messages based on the influence data and a second selectable input to sort and present the portion of the ranked plurality of messages based on the engagement data.

3. A non-transitory computer-readable medium containing computer executable instructions that, when executed by a processor, cause the processor to perform a method, the method comprising:
  identifying message data representing a message received by a message receiver identity from a message sender identity, wherein the message data relates to media content published by the message receiver;
  determining influence data representing a level of influence associated with the message sender identity;
  determining engagement data representing a level of engagement of the message sender with the media content published by the message receiver, wherein the level of engagement is based on a number of interactions between the message sender and at least one viewer of the media content published by the message receiver relating to the media content published by the message receiver;
  determining a score for the message as a function of the influence data and the engagement data;
  ranking a plurality of messages to the message receiver that includes the message, wherein the rank is based on the determined score associated with each of the plurality of messages; and presenting at least a portion of the ranked plurality of messages in a user interface based on the score determined as a function of the influence data and the engagement data, wherein the user interface includes a first selectable input to sort and present the portion of the ranked plurality of messages based on the influence data and a second selectable input to sort and present the portion of the ranked plurality of messages based on the engagement data.

4. The system of claim 1, wherein the message is at least one of an email message, a text message, a message to a user account inbox, a post to an online service, or a post to an online service in a moderation context.

5. The system of claim 1, wherein the processor is further programmed to access the message data via interfacing to a message system associated with the message.

6. The system of claim 1, wherein the message relates to media content syndicated to the message receiver.

7. The system of claim 1, wherein the processor is further programmed to determine the influence data based on a set of users that interact with the published media content associated with the message sender.

8. The system of claim 1, wherein the processor is further programmed to determine the engagement data based on interactions that occur on forums hosted by multiple online services.

9. The system of claim 1, wherein the presentation of the at least a portion of the ranked plurality of messages includes a representation of the score associated with each message.

10. The system of claim 1, wherein the processor is further programmed to identify the message sender based on identity data that represents an account identifier for an online service that is associated with the message sender.

11. The method of claim 2, wherein the presentation of the at least a portion of the ranked plurality of messages includes a representation of the score associated with each message.

12. The method of claim 2, further comprising identifying identity data representing an account identifier for an online service that is associated with the message sender.

13. The non-transitory computer-readable medium of claim 3, wherein determining the influence data determines the level of influence based on at least one of: a set of user identities that interact with published content associated with the message sender identity or a subset of the set of user identities that satisfy a defined condition.

14. The non-transitory computer-readable medium of claim 3, wherein determining the engagement data determines the level of engagement based on at least one of: a set of interactions between the message sender identity and the message receiver identity or interactions that occur on forums hosted by multiple online services.

15. The system of claim 7, wherein the processor is further programmed to determine the influence data based on a subset of the set of users that satisfy a defined condition.

16. The system of claim 8, wherein the presentation of the at least a portion of the ranked plurality of messages is organized by respective scores of the messages.

* * * * *